March 27, 1934.  R. GREGG  1,952,982
HITCH AND LIFT FOR TWO-ROW LISTERS
Filed March 14, 1933   3 Sheets-Sheet 1
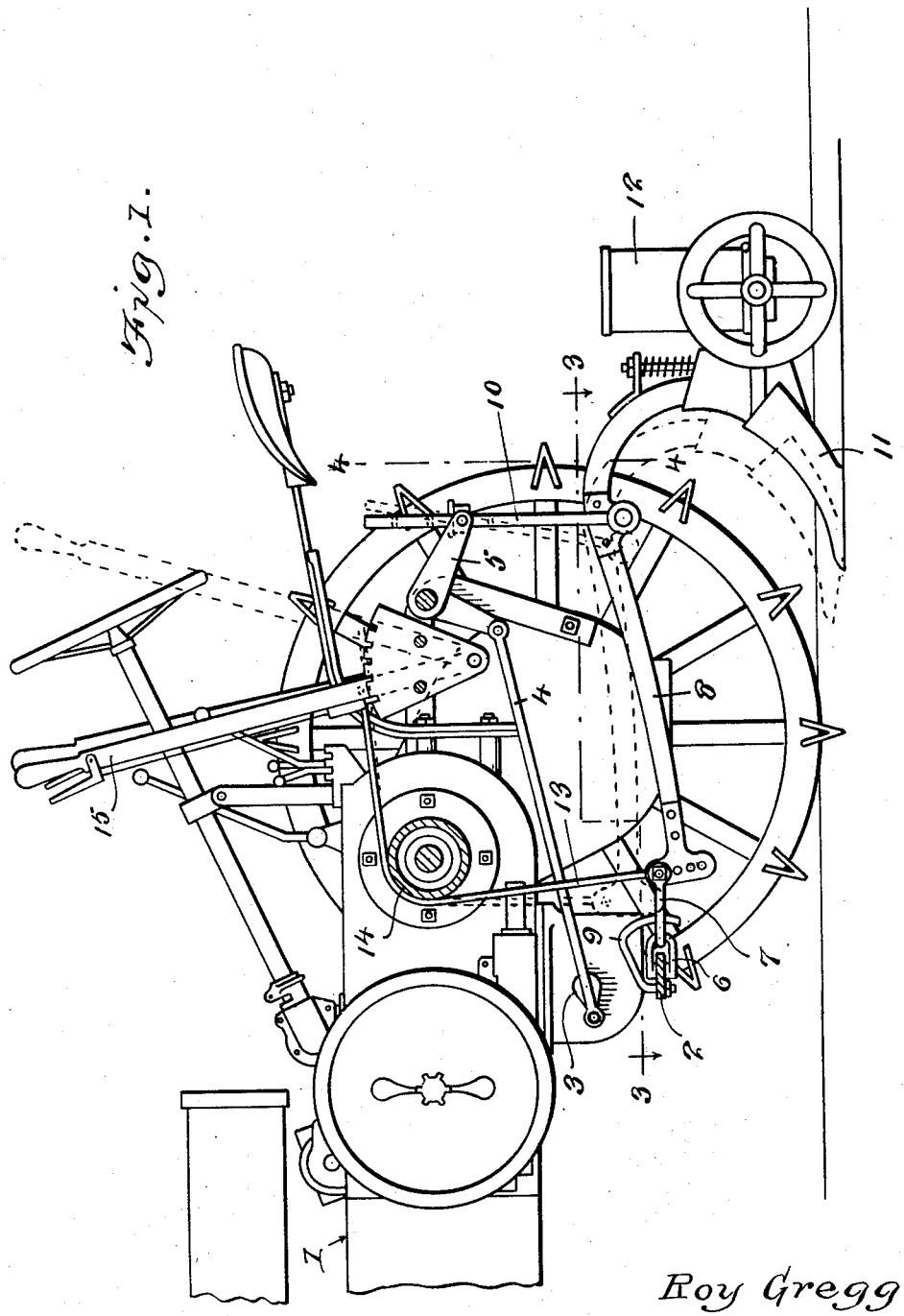
Roy Gregg
INVENTOR
BY Victor J. Evans & Co.
ATTORNEY

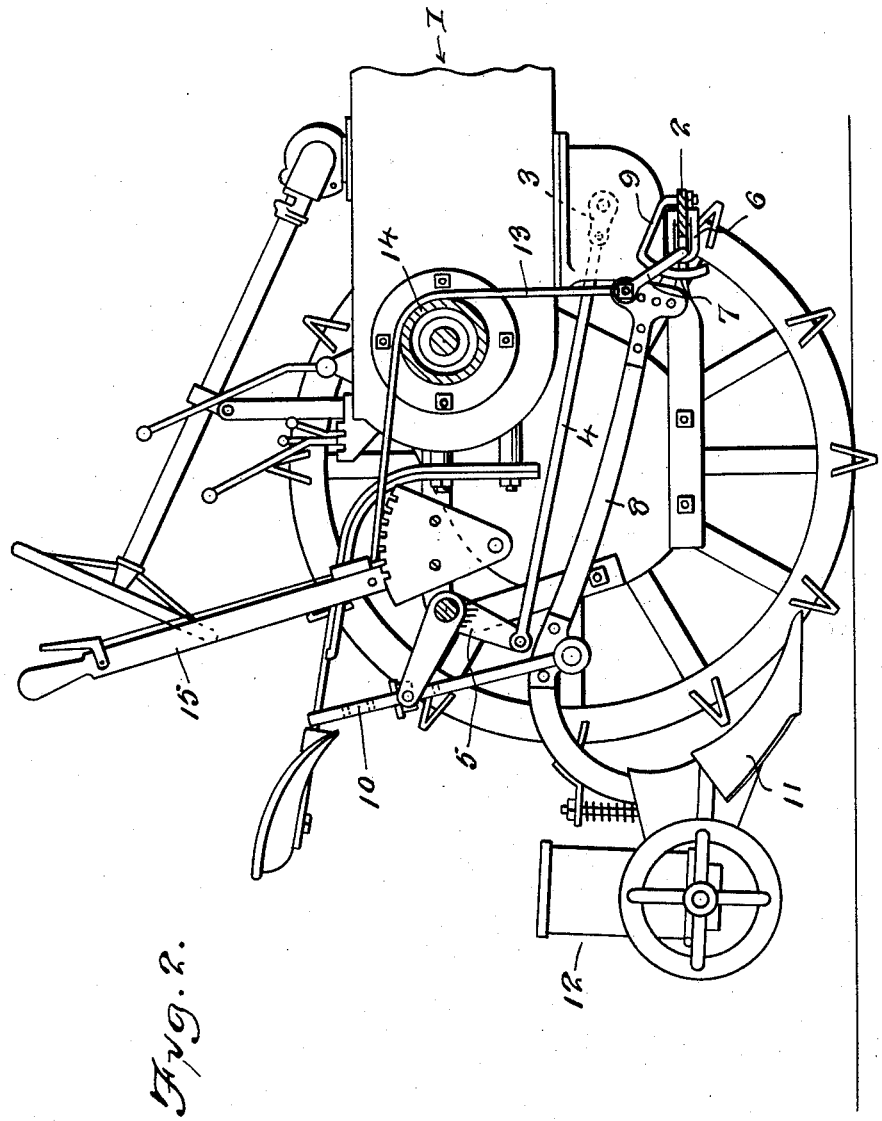

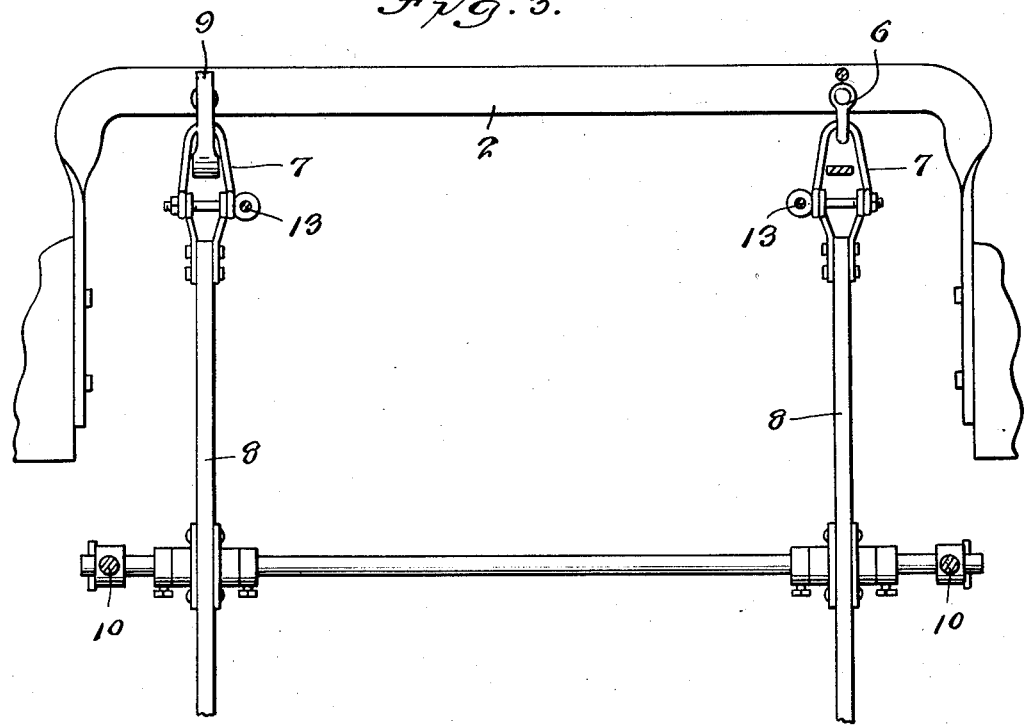
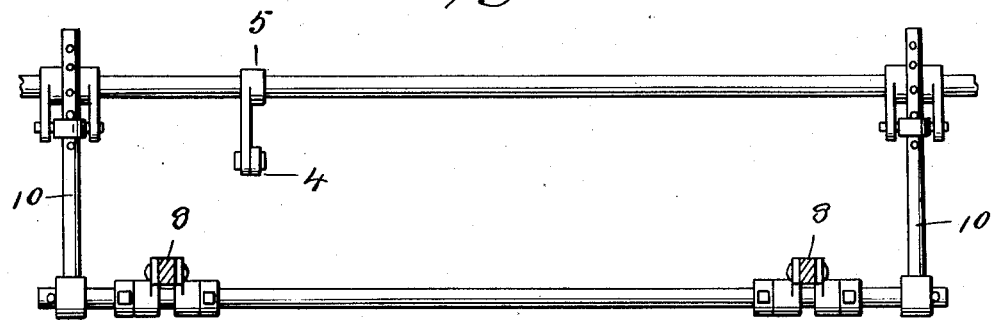
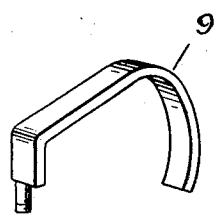

Patented Mar. 27, 1934

1,952,982

UNITED STATES PATENT OFFICE 1,952,982

HITCH AND LIFT FOR TWO-ROW LISTERS

Roy Gregg, Nehawka, Nebr.

Application March 14, 1933, Serial No. 660,730

2 Claims. (Cl. 97—47)

This invention relates to a combined hitch and lifter for a two row lister and has for the primary object, the provision of a device of the above stated character which couples the lister and tractor in close relation to each other so as to permit abrupt or short turns to be made and provides means whereby the depth of the furrows made may be varied to suit conditions, also permit either of the plows to be raised or lowered independently of each other to compensate for uneveness of the ground or when the device is operated with one or the other of its drive wheels in a furrow.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a combined hitch and lifter employed for connecting a lister to a tractor.

Figure 2 is a view similar to Figure 1 showing the plows in elevated or inoperative position.

Figure 3 is a sectional view taken on the line 3—3 of Figure 1.

Figure 4 is a sectional view taken on the line 4—4 of Figure 1.

Figure 5 is a perspective view illustrating a guide for preventing side sway of the forward end of the plow beam.

Referring in detail to the drawings, the numeral 1 indicates a well known type of tractor equipped with a draft beam 2 located forwardly of its rear end and a power take-off 3 especially adapted for reciprocating the pitman or connecting rod 4 employed to rock a bell crank lever 5 for the raising and lowering of an implement connected to the tractor.

Arranged adjacent the ends of the draft beam are pivoted clevises 6 which receive clevises 7 and permit the latter to swing upwardly and downwardly relative to the draft beam. The clevises 7 are pivotally and adjustably connected to the forward ends of plow beams 8. Guide elements 9 are secured to the draft beam 2 and extend into the clevises 7 for preventing the front ends of the plow beams from having undue swinging motion in a lateral direction relative to the tractor. Rearwardly of the forward ends of the plow beams are pivoted elevating bars 10 adjustably connected to the bell crank lever 5 so that the power take-off 3 may, during its operation, effect raising or lowering of the rear end of the plow beams for positioning the plow shares 11 in operative or inoperative position. The shares 11 are of the lister type for the purpose of forming furrows in the ground so that planters 12 following directly behind the shares may deposit seeds in the furrows, it being understood that the planters 12 are carried by the beams 8. The power take-off 3 of the tractor is controlled by the usual means forming standard equipment of the tractor and in convenient reach of the operator on the tractor.

The plow shares 11 may be adjusted to regulate their cutting depth in the ground by manual control means on the tractor which consists of flexible elements 13 connected to the forward ends of the beams 8 and trained over guides 14 on the tractor and connected to control levers 15 mounted on the tractor and which are equipped with a conventional type of holding rack so that the levers may be rocked in any of their adjusted positions. The levers 15 are located on the tractor in convenient reach of the operator and permit the operator to raise or lower either plow independent of the other so that when one or the other of the drive wheels of the tractor is operating in a furrow the plow adjacent thereto may be elevated slightly so that the furrow formed thereby will be of a depth equal to the furrow formed by the other plow.

While I have shown and described the preferred embodiment of my invention, it will be understood that minor changes in construction, combination and arrangement of parts may be made without departing from the spirit and scope of my invention, as claimed.

Having described the invention, I claim:

1. In combination with a tractor having a draft beam forwardly of the rear end thereof, and plow implements arranged rearwardly of the tractor, interconnecting clevises pivoted to the draft beam and to the plow implements, and guides carried by the draft beam and received by some of said clevises to limit side swinging of the forward ends of the plow implements.

2. In combination with a tractor having a power take-off and draft beam, plow beams pivoted to the draft beam, plow shares on the plow beam, lifting bars pivoted to the beams, bell crank levers pivoted to the tractor and adjustably connected to the bars, means connecting the bell crank levers to the power take-off for raising and lowering the plow shares for positioning the latter in operative and inoperative positions, control levers carried by the tractor, flexible elements connected to the control levers and to the forward ends of the plow beams, and guides on the tractor and having the flexible elements trained thereover.

ROY GREGG.